US008281769B2

(12) United States Patent
Hudak et al.

(10) Patent No.: US 8,281,769 B2

(45) Date of Patent: Oct. 9, 2012

(54) SYSTEM AND METHOD FOR VENTING FUEL VAPORS IN AN INTERNAL COMBUSTION ENGINE

(75) Inventors: Eric B. Hudak, Sheboygan, WI (US); Travis D. Schisel, Cato, WI (US); Edward A. Uebelher, Oshkosh, WI (US)

(73) Assignee: Kohler Co., Kohler, WI (US)

( * ) Notice: Subject to any disclaimer, the term of this patent is extended or adjusted under 35 U.S.C. 154(b) by 301 days.

(21) Appl. No.: 12/579,717

(22) Filed: Oct. 15, 2009

(65) Prior Publication Data

US 2010/0095937 A1 Apr. 22, 2010

Related U.S. Application Data

(60) Provisional application No. 61/107,291, filed on Oct. 21, 2008.

(51) Int. Cl.
*F02M 37/20* (2006.01)
*F16K 24/00* (2006.01)

(52) U.S. Cl. ........ 123/516; 123/518; 137/587; 137/588; 137/590

(58) Field of Classification Search .................. 123/516, 123/518, 519; 137/587, 588, 589, 590, 591, 137/592, 593, 578; 220/748, 749, 745–747
See application file for complete search history.

(56) References Cited

U.S. PATENT DOCUMENTS

| | | | | |
|---|---|---|---|---|
| 3,372,679 | A * | 3/1968 | Aitken | 123/519 |
| 3,610,220 | A * | 10/1971 | Yamada et al. | 123/518 |
| 3,672,537 | A * | 6/1972 | Kitzner | 220/746 |
| 3,687,335 | A * | 8/1972 | Hunter | 220/746 |
| 3,696,799 | A * | 10/1972 | Gauck | 123/518 |
| 3,698,160 | A * | 10/1972 | Hunter | 55/385.3 |
| 3,771,690 | A * | 11/1973 | Hunter | 220/746 |
| 3,779,224 | A * | 12/1973 | Tagawa et al. | 123/518 |
| 3,961,724 | A * | 6/1976 | Kapsy | 220/371 |
| 4,028,075 | A * | 6/1977 | Roberge | 96/139 |
| 4,166,550 | A * | 9/1979 | Kleinschmit et al. | 220/746 |

(Continued)

FOREIGN PATENT DOCUMENTS

EP 1655476 A2 5/2006

(Continued)

OTHER PUBLICATIONS

PCT/US2009/005709; Notice of Transmittal of International Preliminary Report on Patentability and Written Opinion of the International Searching Authority; May 5, 2011; 6 pages.

(Continued)

*Primary Examiner* — Thomas Moulis
(74) *Attorney, Agent, or Firm* — Whyte Hirschboeck Dudek S.C.

(57) ABSTRACT

An evaporative venting system for use in an internal combustion engine and a method for venting fuel vapors are disclosed. The evaporative venting system includes a containment chamber at least in indirect communication with a fuel tank and a passageway defined within the containment chamber and having an inlet opening and an outlet opening. The inlet opening is at least indirectly in communication with the fuel tank and the outlet opening is at least indirectly in communication with an evaporative chamber such that the passageway provides a vent path between the fuel tank and the evaporative chamber such that the vent path allows for both the venting of fuel vapors from the fuel tank and the intake of air into the fuel tank during all angles of positioning of the fuel tank.

22 Claims, 9 Drawing Sheets

U.S. PATENT DOCUMENTS

| | | | | | |
|---|---|---|---|---|---|
| 4,531,653 | A * | 7/1985 | Sakata | 220/746 |
| 4,646,701 | A * | 3/1987 | Fukumoto | 123/519 |
| 4,714,171 | A * | 12/1987 | Sasaki et al. | 220/746 |
| 4,836,402 | A * | 6/1989 | Sasaki | 220/746 |
| 4,842,006 | A * | 6/1989 | Scheurenbrand et al. | 137/202 |
| 4,852,761 | A * | 8/1989 | Turner et al. | 220/746 |
| 4,919,103 | A * | 4/1990 | Ishiguro et al. | 123/514 |
| 5,676,115 | A * | 10/1997 | Linsbauer et al. | 123/516 |
| 5,704,337 | A * | 1/1998 | Stratz et al. | 123/519 |
| 5,868,119 | A * | 2/1999 | Endo et al. | 123/516 |
| 5,894,833 | A * | 4/1999 | Kikuchi et al. | 123/516 |
| 5,924,410 | A * | 7/1999 | Dumas et al. | 123/519 |
| 6,182,693 | B1 * | 2/2001 | Stack et al. | 137/565.17 |
| 6,269,802 | B1 * | 8/2001 | Denis et al. | 123/519 |
| 6,273,070 | B1 * | 8/2001 | Arnal et al. | 123/519 |
| 6,302,137 | B1 * | 10/2001 | Devall | 137/202 |
| 6,390,074 | B1 * | 5/2002 | Rothamel et al. | 123/519 |
| 6,467,464 | B2 * | 10/2002 | Burke et al. | 123/520 |
| 6,491,180 | B2 * | 12/2002 | Distelhoff et al. | 220/562 |
| 6,527,008 | B2 | 3/2003 | Meyer et al. | |
| 6,543,426 | B1 * | 4/2003 | Schwochert | 123/516 |
| 6,634,342 | B1 * | 10/2003 | Wouters et al. | 123/516 |
| 6,698,475 | B2 * | 3/2004 | Schaefer et al. | 141/325 |
| 6,904,943 | B2 * | 6/2005 | Dennis | 141/1 |
| 6,948,523 | B2 * | 9/2005 | Viebahn | 137/588 |
| 6,964,268 | B2 * | 11/2005 | Stickel | 123/516 |
| 7,047,948 | B2 * | 5/2006 | Gerhardt et al. | 123/516 |
| 7,086,389 | B2 * | 8/2006 | Yamada | 123/516 |
| 7,086,390 | B2 * | 8/2006 | Shears et al. | 123/518 |
| 7,100,580 | B2 * | 9/2006 | Lin et al. | 123/516 |
| 7,165,536 | B2 * | 1/2007 | Kirk et al. | 123/519 |
| 7,185,638 | B2 * | 3/2007 | Krogull et al. | 123/509 |
| 7,185,640 | B2 * | 3/2007 | Shears et al. | 123/519 |
| 7,267,112 | B2 * | 9/2007 | Donahue et al. | 123/518 |
| 7,320,314 | B2 * | 1/2008 | Kashima et al. | 123/519 |
| 7,438,059 | B2 * | 10/2008 | Mills et al. | 123/519 |
| 7,520,293 | B2 * | 4/2009 | Hilderley et al. | 137/202 |
| 7,610,905 | B2 * | 11/2009 | Callahan et al. | 123/518 |
| 7,677,277 | B2 * | 3/2010 | Thompson et al. | 141/350 |
| 2005/0284450 | A1 | 12/2005 | Mills | |
| 2006/0016436 | A1 * | 1/2006 | Groom et al. | 123/520 |
| 2008/0251053 | A1 * | 10/2008 | Shears et al. | 123/518 |

FOREIGN PATENT DOCUMENTS

| | | | |
|---|---|---|---|
| EP | 1676996 | A1 | 5/2006 |
| GB | 2401910 | A1 | 11/2004 |

OTHER PUBLICATIONS

Notification of Transmittal of the International Search Report and the Written Opinion of the International Searching Authority, or the Declaration; dated Dec. 23, 2009; 11 pages.

* cited by examiner

SYSTEM AND METHOD FOR VENTING FUEL VAPORS IN AN INTERNAL COMBUSTION ENGINE

CROSS-REFERENCE TO RELATED APPLICATION

This application claims the benefit under 35 USC §119(e) of U.S. Provisional Application No. 61/107,291, filed Oct. 21, 2008, the teachings and disclosure of which are incorporated herein by reference.

FIELD OF THE INVENTION

The present invention relates to internal combustion engines and, more particularly, to fuel vapor vent systems employed in internal combustion engines.

BACKGROUND OF THE INVENTION

Small internal combustion engines are used in a wide variety of applications including for example, lawn mowers, lawn tractors, snow blowers, power machinery and the like. Frequently, such internal combustion engines employ a fuel tank for storing liquid fuel. When situated within the fuel tank, certain amounts of liquid fuel typically becomes vaporized as hydrocarbons, particularly when temperatures within the tank rises, when the tanks experience high levels of jostling, and/or when the volume within the tank unoccupied by fuel (and filled with air) becomes rather large relative to the air space. The vaporization of fuel continues even during the normal course of storage of the fuel within the fuel tank.

During engine operation, fuel from the fuel tank is supplied to the engine. Typically, fuel is supplied from the fuel tank to the engine by virtue of receiving air into the fuel tank from the atmosphere to replace the fuel. In many engines, atmospheric air can be received via a vent tank cap. Although the vent tank cap allows air into the fuel tank to supply fuel to the engine, it additionally allows fuel vapors from the fuel tank to enter the environment, thereby contributing to evaporative emissions from such engines. Thus, such emissions from the fuel tanks particularly occur when passage(s) are formed that link the interior of the fuel tank with the outside atmosphere, for example, for venting purposes as well as when refueling occurs.

Such venting of fuel vapors although not desired, is generally essential to avoid damage to the fuel tank and various other components associated with the fuel tank (e.g., the fuel tank system) and additionally to provide a supply of fuel to the engine. However, the venting of the fuel vapors can contribute to ozone and urban smog and otherwise negatively impact the environment. In fact, certain federal or state regulations, such as the California Air Resource Board regulations, prohibit venting of fuel vapors directly into the atmosphere. Thus, increasingly it is desired that these evaporative emissions from fuel tanks be entirely eliminated or at least substantially reduced.

Accordingly, to address concerns relating to fuel vapor emissions, various options have been proposed in the past. For example, at least some conventional mechanisms involve employing a sealed fuel tank cap such that any fuel vapors are vented to or from the tank through a carbon canister, which typically is a unitary enclosure that contains a material for filtering fuel vapors. The carbon canister is generally mounted separate and away from and above the fuel tank. Although the usage of carbon canisters eliminates or at least reduces the emissions of fuel vapors into the environment, they are inadequate in at least some aspects. For example, when an engine is operated or maintained in a variety of positions and/or angles, the use of carbon canisters for facilitating venting operations can add complexity to the design of the overall fuel system. In addition, certain angled positions can allow the liquid fuel in the tank to move such that it can enter the carbon canister and subsequently leak out through an atmospheric vent in the carbon canister.

Another conventional option employs a rollover valve. When a rollover valve is situated in a vent path (e.g., a path within the engine for venting the fuel vapors into the atmosphere) of an engine, the valve is oriented such that the vent path is closed off when the engine is situated at a predetermined angle. When the vent path is closed off, the amount of fuel that can leave the tank and pass through to the engine is limited. Limiting the amount of fuel to the engine undesirably limits the performance of the engine.

Furthermore, the usage of rollover valve(s) and carbon canister(s) adds complexity to the fuel system either in the fuel tank design or due to utilization of additional components such as, various brackets and multiple hoses that are required for the operation of such devices (e.g., the rollover valve and the carbon canister). These additional components can add to the overall cost of the engine and can further require various vehicle and engine design accommodations to provide for the bulky equipment and necessary positioning of the equipment. These components are also susceptible to damage and malfunction. For example, when used on a lawn mower engine, the components can be dragged against or otherwise ensnared with brush, tree branches or ground. In addition, rollover valves have moving parts that can fail or operate incorrectly, and associated components, (e.g., hoses) that can deteriorate over time.

For at least these reasons, therefore, it would be advantageous if an improved system/device and/or method could be created to prevent or reduce evaporative emissions from fuel tanks, such as the fuel tanks of internal combustion engines including, for example, small off road engines (SORE). It would also be advantageous if such an improved evaporative fuel venting system/method did not affect engine performance at various angles of operation, was capable of eliminating the need for at least a rollover valve, and was more reliable, simpler and/or cost effective as compared to conventional evaporative fuel venting systems/methods.

BRIEF DESCRIPTION OF THE DRAWINGS

Embodiments of the invention are disclosed with reference to the accompanying drawings and these embodiments are provided for illustrative purposes only. The invention is not limited in its application to the details of construction or the arrangement of the components illustrated in the drawings. Rather, the invention is capable of other embodiments and/or of being practiced or carried out in other various ways. The drawings illustrate a best mode presently contemplated for carrying out the invention. Like reference numerals are used to indicate like components. In the drawings.

DETAILED DESCRIPTION OF THE PREFERRED EMBODIMENT

Figure 1:
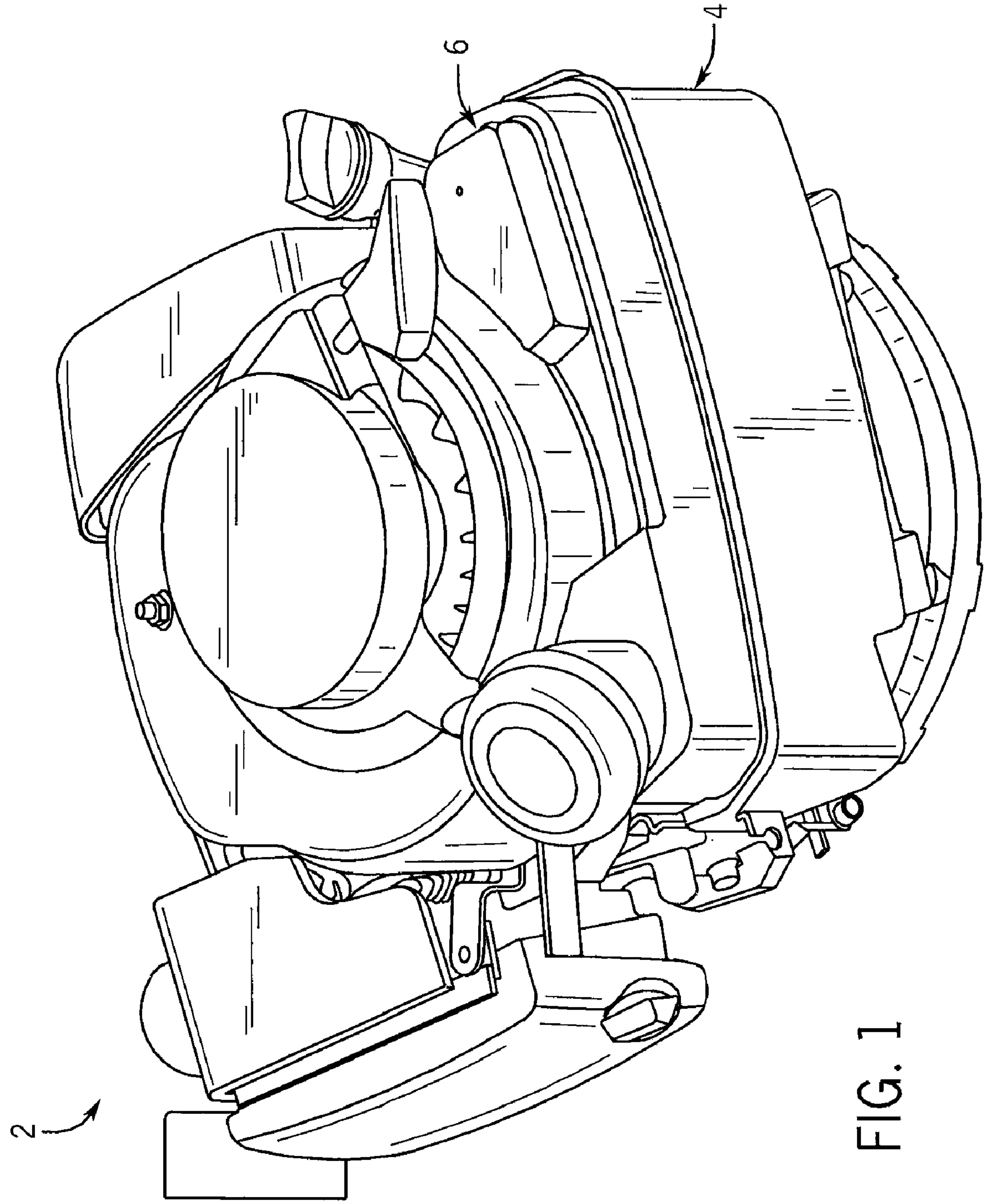
FIG. 1 is a perspective view of a vertical crankshaft internal combustion engine having a fuel tank and a first embodiment of an evaporative fuel tank vent system operatively mounted to the fuel tank, in accordance with at least some embodiments of the present invention.

Referring to FIG. 1, a perspective view of a vertical crankshaft internal combustion engine 2 having a fuel tank 4 is shown, in accordance with at least some embodiments of the present invention. Also shown is an evaporative fuel tank vent system 6 mounted in operational association with the fuel tank 4. The evaporative fuel tank vent system 6 is contemplated for use in, as part of, or in conjunction or combination with the internal combustion engine 2. For example, in at least some embodiments, the evaporative fuel tank vent system 6 can be used in the Courage family of vertical crankshaft engines available by the Kohler Company of Kohler, Wis. Notwithstanding the fact that in the present embodiment, the internal combustion engine 2 is a vertical crankshaft engine, it will be understood that in other embodiments, the evaporative fuel tank vent system 6 can be employed with horizontal crankshaft engines as well including, the Courage family of horizontal crankshaft engines, also available from the Kohler Company. In alternate embodiments, the evaporative fuel tank vent system 6 can be employed in other types of engines as well.

In particular, the internal combustion engine 2 can be any of a wide variety of engines. For example, some embodiments of the present invention can be employed in conjunction with SORE engines including Class 1 and Class 2 small off-road engines such as those implemented in various machinery and vehicles, including, for example, lawn movers, air compressors, and the like. Indeed, in at least some such embodiments, the present invention is intended to be applicable to "non-road engines" as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Figure 2:
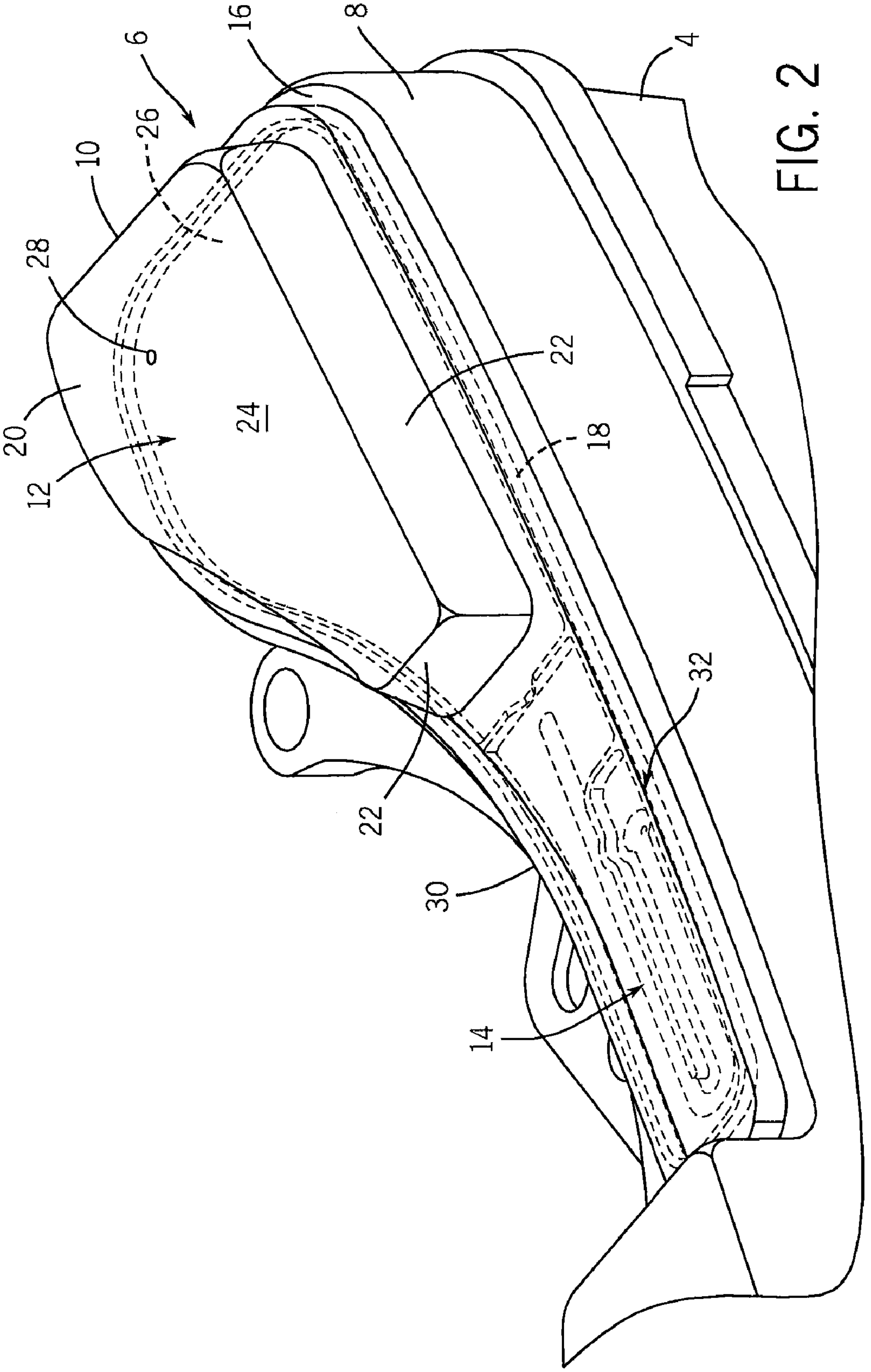
FIG. 2 is a perspective view of the evaporative fuel tank vent system of FIG. 1 mounted in relation to the fuel tank, the evaporative fuel tank vent system having a base portion and a cover portion connected together in operational association.

Referring now to FIG. 2, the evaporative fuel tank vent system 6 includes a base portion 8 mounted atop the fuel tank 4, and a cover portion 10 operatively mounted and secured over the base portion. In at least some embodiments, the base portion 8 can be integrally formed with or alternatively secured to the fuel tank 4 to form a top portion of the fuel tank, thereby sharing a wall with the fuel tank. Further, the base portion 8 can be integrally formed with or secured to either an inside portion of the fuel tank 4 or be situated external and over the fuel tank using fasteners or welding. Further, in at least some embodiments, the cover portion 10 can be secured to the base portion 8 in a wide variety of manners including, for example, a variety of fasteners or possibly even welding. In at least some other embodiments, the cover portion 10 can be secured to the base portion 8 using a friction fitting such as a post and a mating grommet.

Further, in some embodiments, each of the base and the cover portions 8 and 10 can be manufactured out of a composite plastic (e.g., by injection molding) or another durable and suitable material such as metal. Although the base portion 8 and cover portion 10 have been depicted and described as being separate components, in at least some embodiments, the base and the cover portions can be of unitary construction manufactured integrally as one component. Additionally, portions of either one of the base portion 8 and cover portion 10 can be manufactured as a portion of the other. Furthermore, the base portion 8 and the cover portion 10 are designed to define therebetween a containment chamber 14 and an evaporative chamber 12, both of which are visible only partially in FIG. 2 through the translucent cover portion 10. It is understood that, in the present embodiment, the cover portion 10 has been shown as being translucent for clarity of expression and to show the components therein. In practice, the cover portion 10 will typically be opaque or substantially opaque, although variations are contemplated and considered within the scope of the invention.

Figure 3:
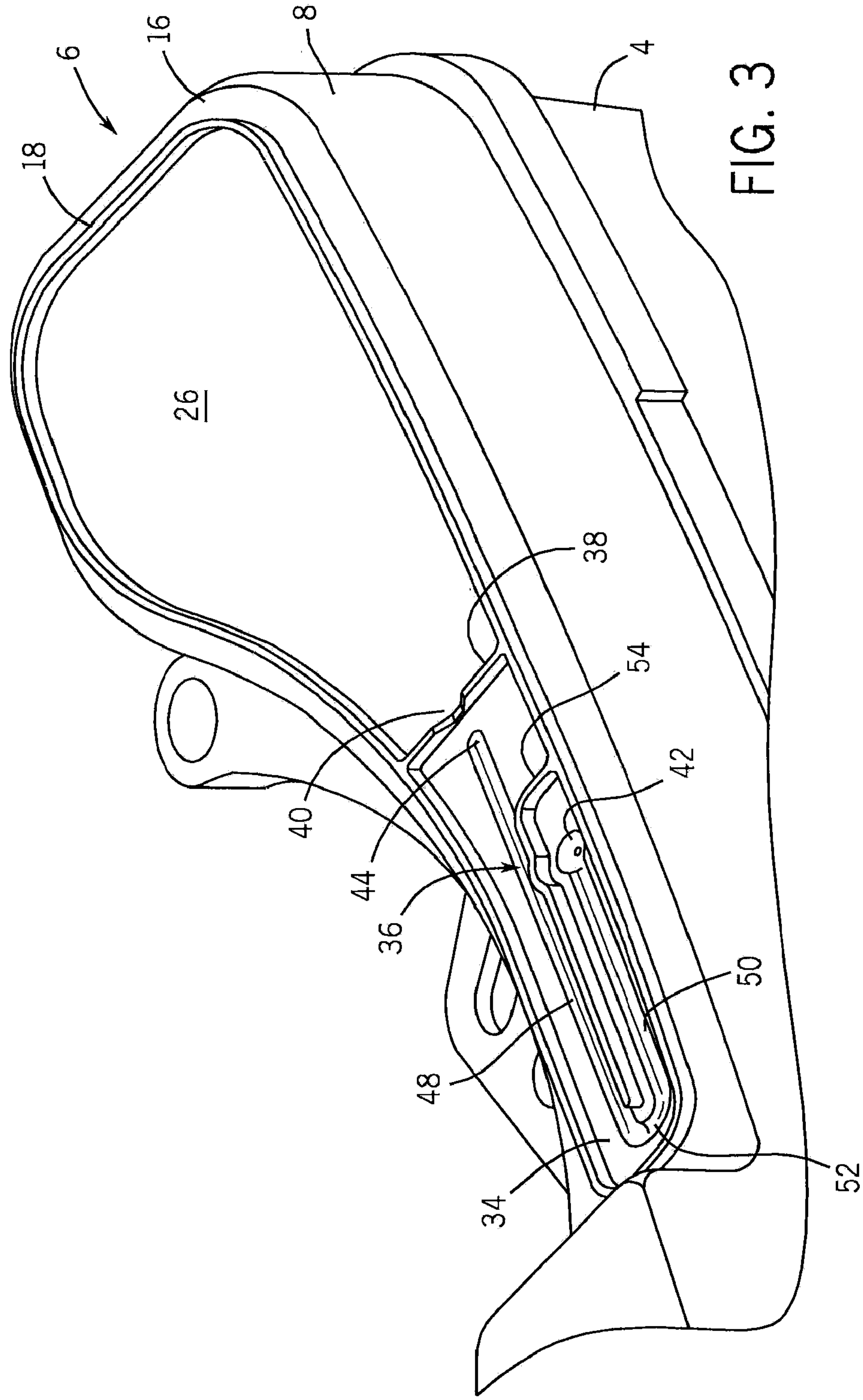
FIG. 3 is a perspective view of the base portion of the evaporative fuel tank vent system of FIG. 1.

Referring now to FIG. 3 in conjunction with FIG. 2, a perspective view of the base portion 8 is shown, in accordance with at least some embodiments of the present invention. In particular, the base portion 8 includes a base top portion 16 defining an edge barrier 18 about a periphery thereof. In at least one embodiment, the edge barrier 18 in particular, is employed for seating the cover portion 10 thereabout, providing a substantially airtight seal for substantially limiting the leakage of fuel or fuel vapors therefrom and for substantially defining the perimeter of each of the containment and the evaporative chambers 14 and 12, respectively. In some embodiments, the edge barrier 18 can take the form of a rubber seal integrally formed with or secured to the base top portion 16. The rubber seal can extend vertically as a rigid portion such that the height of the edge barrier is sufficient to at least partially contain the flow of liquid fuel and snugly seat the cover portion 10 thereabout. In at least some other embodiments, the edge barrier 18 can be secured to the cover portion or otherwise secured to a combination of the base and the cover portions 8 and 10, respectively. Various other configurations of the edge barrier 18 are contemplated and considered within the scope of the present invention.

With respect to the evaporative chamber 12 in particular, in the present embodiment it is employed for exhausting filtered fuel tank vapors into the atmosphere and for providing atmospheric air intake for the fuel tank 4. Typically, the evaporative chamber 12 is an enclosed chamber defined by a top wall 20 and sidewalls (only two of which are visible) 22, respectively of a first portion 24 of the cover portion 10 and a first portion 26 of the base top portion 16 of the base portion 8. In at least some embodiments, the evaporative chamber 12 has situated therein an evaporative filter (not shown) constructed of carbon or another suitable material (e.g., another adsorption material) such that any fuel vapors entering the evaporative chamber travel through the filter for filtering. The filtered fuel vapors can then be released into the atmosphere by way of an atmospheric vent 28 formed in the top wall 20 of the cover portion 10. Thus, the atmospheric vent 28 is positioned such that fuel vapors entering the evaporation chamber 12 will pass substantially through the evaporative filter and out through the atmospheric vent. While in the present embodiment the atmospheric vent 28 is positioned in the top wall 20, in at least some other embodiments, the atmospheric vent can be positioned elsewhere. For example, in other embodiments the atmospheric vent 28 may be located on any of the sidewalls 22, with the evaporative filter being positioned within the evaporative chamber 12 such that the filtered fuel vapors are directed towards the atmospheric vent.

Notwithstanding the fact that, in the present embodiment, the evaporative filter is situated within the evaporative chamber 12 for filtering fuel vapors, this need not be the case in other embodiments. Rather, in at least some other embodiments, the evaporative filter can be located at least partially external to and in communication with the evaporative chamber. By virtue of such a communication between the at least partially externally located evaporative filter and the evaporative chamber 12, any fuel vapors within the evaporative chamber can travel through the atmospheric vent 28 to the evaporative filter for filtering and then released into the atmosphere.

The fuel vapors from the fuel tank 4 are communicated to the evaporative chamber 12 via the containment chamber 14. To prevent leakage of the fuel vapors traveling from the fuel tank 4 to the evaporative chamber 12, similar to the evaporative chamber, the containment chamber 14 is an enclosed chamber. In particular, the containment chamber 14 is defined by a top wall 30 of a second portion 32 of the cover portion 10, a second portion 34 of the base top portion 16, at least partially by way of the cover portion seating about the edge barrier 18 and an additional barrier described below. In addition to communicating fuel vapors from the fuel tank 4 to the evaporative chamber 12 for filtering, the containment chamber 14 also at least partially limits the spillage of liquid fuel from the fuel tank and further restricts travel of fuel from the fuel tank into the evaporative chamber. To this effect, the containment chamber 14 includes a specially designed passageway 36 defined on the second portion 34 of the base top portion 16. The passageway 36 is described in greater detail with respect to FIGS. 4 and 5. Thus, the containment chamber 14 is intended to direct the flow of fuel vapors between the fuel tank 4 and the evaporative chamber 12 and to restrict the flow of liquid fuel from the fuel tank into the evaporative chamber.

Furthermore, to the extent that each of the evaporative and the containment chambers 12 and 14, respectively, are enclosed chambers, to facilitate travel of fuel vapors from the containment chamber to the evaporative chamber and to restrict travel of fuel between those chambers, the present invention provides a chamber barrier 38. The chamber barrier 38 is positioned between the evaporative and the containment chambers 12 and 14, respectively, and extends at least partially upwardly from the base top portion 16 towards the top walls 20 and 30 of the cover portion 10 to at least substantially restrict the travel of liquid fuel from the containment chamber to the evaporative chamber. In at least some embodiments, the chamber barrier 38 can be formed as portions and/or extensions of the edge barrier 18 although in other embodiments, the chamber barrier can be a separate component operatively secured to the base top portion 16. Although the chamber barrier 38 substantially restricts the fuel from entering the evaporative chamber 12, residual or minute quantities of fuel can nevertheless enter the evaporative chamber in at least some circumstances including, for example, when the fuel tank 4 is being jostled substantially.

Thus, in such circumstances when residual or minute quantities of fuel enters the evaporative chamber 12, the fuel from the evaporative chamber can be facilitated to flow back into the fuel tank 4 via the containment chamber 14 by way of a barrier opening 40 defined within the chamber barrier 38. The barrier opening 40 thus allows the flow of liquid fuel from the evaporative chamber 12 to the containment chamber 14 and additionally allows the passage of fuel vapors from the containment to the evaporative chambers.

Figure 4:
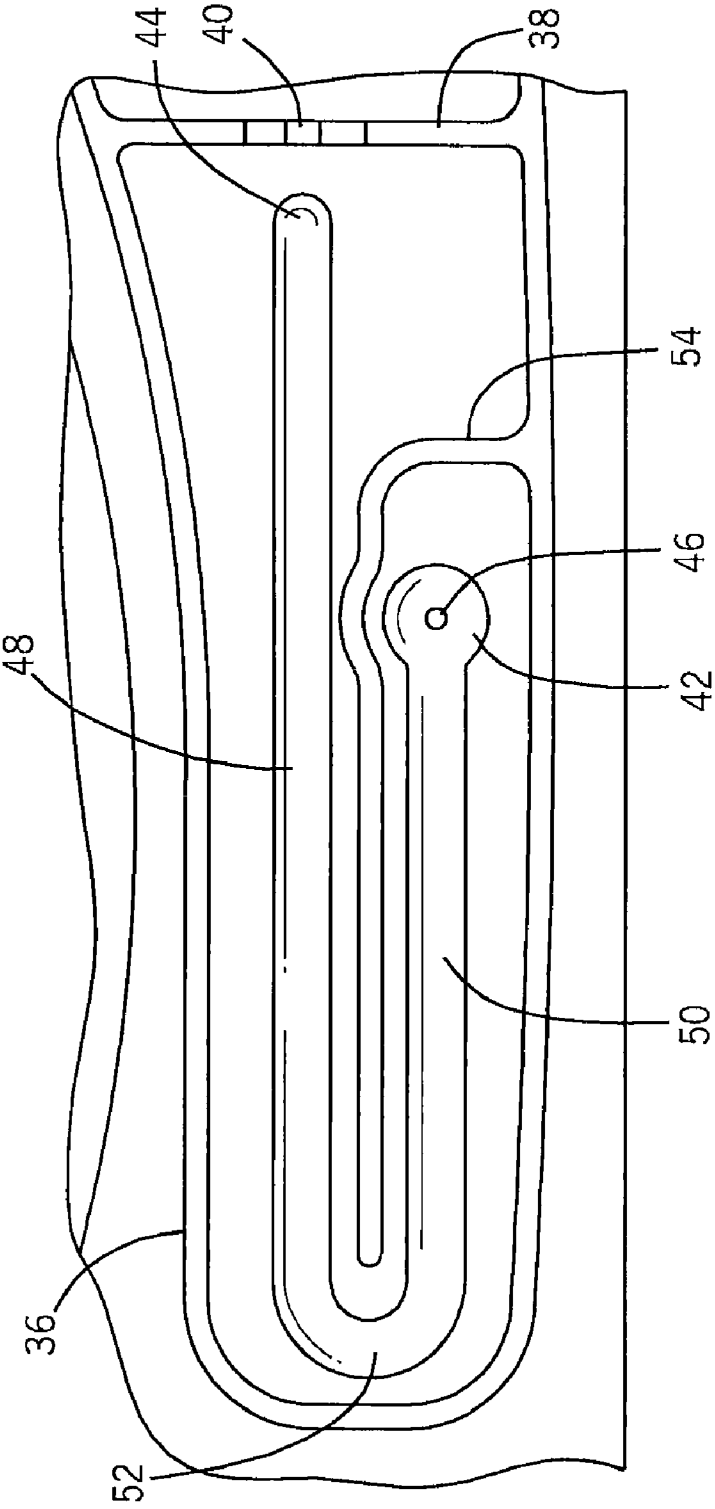
FIG. 4 is an enlarged top view of a portion of the base portion of FIG. 2.
Figure 5:
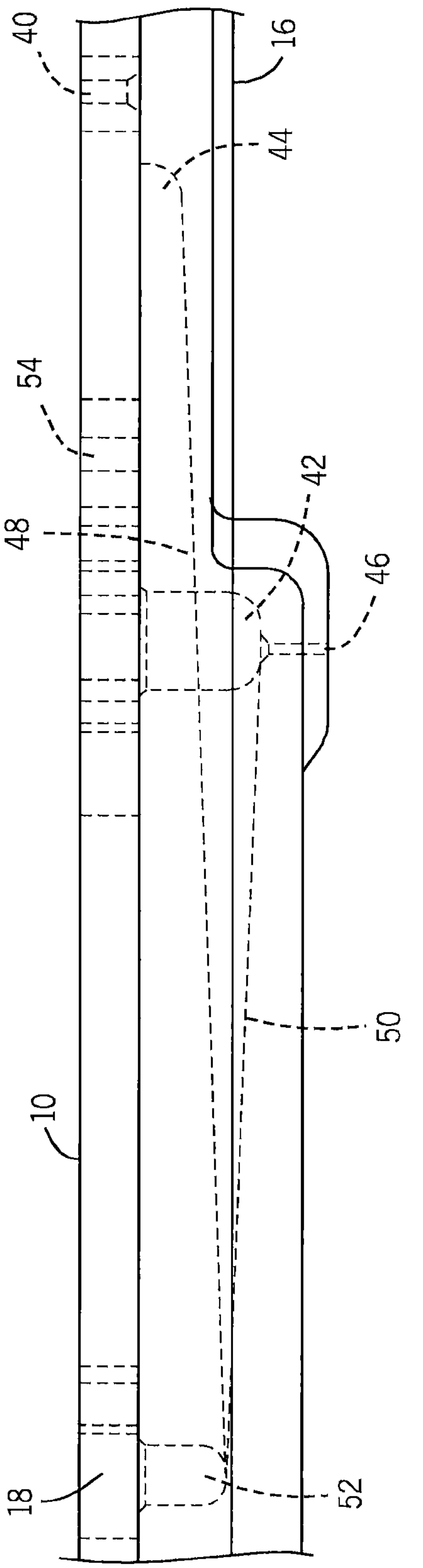
FIG. 5 is a transparent side view of the base portion of FIG. 2.

Referring now to FIGS. 4 and 5, FIG. 4 illustrates the second portion 34 of the base top portion 16 defining the passageway 36 in an enlarged form and FIG. 5 schematically illustrates the orientation of the passageway, in accordance with at least some embodiments of the present invention. The base top portion 16 includes the passageway 36, the chamber barrier 38 defining the barrier opening 40 and a portion of the edge barrier 18. Referring as well to FIGS. 2 and 3, the passageway 36 in conjunction with the containment chamber 14 (FIG. 2) is intended to provide a gravity induced restriction to substantially limit the exiting of liquid fuel from the fuel tank 4 (FIG. 3) to the evaporative chamber 12 (FIG. 2) while allowing fuel vapors to be vented from the fuel tank 4 to the atmosphere via the evaporative chamber 12.

Still referring to FIGS. 4 and 5 in conjunction with FIGS. 2 and 3, with respect to the dimensions of the passageway 36, the length of the passageway can typically be adjusted from one embodiment to another based upon a specific application and an acceptable size of the base portion 8 for that particular application. For example, a push-behind lawn mower can have a relatively short passageway 36 due to space constraints, while a riding lawnmower can utilize a longer passageway 36. Furthermore, the depth and width of the passageway 36 can vary from one embodiment to another. Generally, the depth and width of the passageway 36 can be such that fuel does not adhere to sidewalls of the passageway, which can prevent the fuel from draining back into the fuel tank 4 appropriately. In at least some embodiments, the diameter of the passageway 36 can be about 1 millimeter to about two millimeters, although in other embodiments the diameter of the passageway can be larger or smaller depending on a particular application.

In addition to the dimensions, the structure of the passageway 36 can vary as well. For example, in at least some embodiments, the passageway 36 can be formed as a depression, such as a channel, in the base top portion 16 extending at least partially into the fuel tank 4. In other embodiments, the passageway 36 can be formed by raised walls on the base top portion 16 such that the passageway is situated above the fuel tank 4. In alternate embodiments, the passageway 36 need not be defined by depressions or raised walls, but rather, suitable flexible (or rigid/semi-rigid) and durable structures such as, tubes or flexible vent lines can be employed to define the passageway that facilitates communication between the fuel tank 4 and the evaporative chamber 12.

Still referring to FIGS. 4 and 5 in conjunction with FIGS. 2 and 3, the passageway 36 additionally includes an inlet opening 42 and an outlet opening 44. Typically, and as shown, the inlet opening 42 is situated at a lower vertical point than the outlet opening 44 such that the inlet opening is in substantial direct communication with the fuel tank 4 via an orifice 46, and the outlet opening is in communication with the evaporative chamber 12 via the barrier opening 40. The size and shape of the orifice 46 can vary depending upon the embodiment. Typically, the orifice 46 is machined or tooled into the base portion 8 and, particularly, within the inlet opening 42 of the passageway 36, although variations in forming the orifice are contemplated and considered within the scope of the present invention. Furthermore, the orifice 46 is designed such that it is not so large as to permit liquid fuel from within the fuel tank 4 to easily splash out into the passageway and is generally small enough to facilitate venting out of the fuel vapors from the fuel tank.

Thus, by virtue of providing the inlet and the outlet openings 42 and 44, respectively, fuel vapors from the fuel tank 4 can be vented into the passageway 36 within the containment chamber 14 via the orifice 46 of the inlet opening. From the passageway 36, the fuel vapors can then be passed to the evaporative chamber 12 through the chamber barrier 38 and the barrier opening 40 via the outlet opening 44 for filtering via the evaporative filter and emitting the filtered fuel vapors (e.g., fuel vapors without the fuel component) into the atmosphere. Thus, the present invention provides a vent path extending from the inlet opening 42 through the outlet opening 44 via the passageway 36 and the evaporative filter in the evaporative chamber 12 to the atmospheric vent 28 for venting fuel vapors. In addition to venting fuel vapors, the vent path is additionally employed for directing intake air received via the atmospheric vent 28. As will be described in greater detail below, at least a portion of the vent path is additionally employed for draining liquid fuel back into the fuel tank 4.

Furthermore, as indicated above, in addition to fuel vapors, in at least some circumstances (e.g., due to vigorous jostling of the fuel within the fuel tank during operation) minute quantities of liquid fuel from the fuel tank 4 can enter the containment chamber 14 and, particularly the passageway 36 within the containment chamber, as described below. To facilitate return of the liquid fuel from the containment chamber 14 back to the fuel tank 4, the passageway 36 is a specially designed passageway in which the liquid fuel can flow back to the fuel tank by gravity. For example, in at least some embodiments, the outlet opening 44 is situated adjacent the chamber barrier 38 within a first passageway portion 48 and the inlet opening 42 is situated away from the chamber barrier and within a second passageway portion 50. The first and the second passageways 48 and 50, respectively, are connected together by way of a redirecting portion 52 to form the passageway 36, which is substantially U-shaped.

In addition, the first and the second passageway portions 48 and 50, respectively, are oriented such that the first passageway portion descends downwardly from the outlet opening 44 towards the redirecting portion 52, and the second passageway portion descends downwardly from the redirecting portion to the inlet opening 42. Thus, the passageway 36 is designed as a continuous downward incline from the outlet opening 44 to the inlet opening 42. The redirecting portion 52, which extends between the outlet opening 44 and the inlet opening 42 via the first and the second passageway portions 48 and 50, respectively, in at least some embodiments is designed with a radius that redirects liquid fuel flow from the first passageway portion to the second passageway portion by about 180 degrees. In other embodiments, the redirecting portion 52 can redirect liquid fuel in any angle or configuration that provides a redirection of flow from the first passageway portion 48 to the second passageway portion 50. By virtue of the continuously inclining passageway 36 from the inlet opening 42 to the outlet opening 44, any fuel within the containment chamber 14 can be drained back into the fuel tank 4 via gravity.

Furthermore, to provide a collection point for liquid fuel to drain back to the fuel tank 4 via the orifice 46 by flowing downwardly from the first passageway portion 48 to the second passageway portion 50, the inlet opening 42 in at least some embodiments can be formed as a pit, recess or a pooling chamber. In other embodiments, the inlet opening 42 can take various other forms and orientations, such as, a planar configuration, which facilitates collection of the liquid fuel for drawing back into the fuel tank 4.

Additionally, to prevent spillage of liquid fuel from the first (or second) passageway portion 48 (or 50) to the second (or first) passageway portion, the base top portion 16 has defined thereon a passageway barrier 54. The passageway barrier 54 extends at least partially between the first and the second passageway portions 48 and 50, respectively, and provides at least a partial barrier to the spillage of liquid fuel directly between the first and the second passageway portions without traversing the redirecting portion 52. In at least some embodiments, the passageway barrier 54 can be included as portions or extensions of the edge barrier 18, while in other embodiments, separate structures can be employed as well.

In operation, when the fuel tank 4 is in a substantially horizontal position (e.g., such as that shown in FIG. 1), the fuel level of the liquid fuel within the fuel tank is generally below the orifice 46 and the vapor space is exposed to the orifice (absent any overfilling of the fuel tank 4). When no demand for fuel from the fuel tank 4 exists or when the temperature of the fuel rises, the fuel vapor in the fuel tank can expand, thereby creating a positive pressure inside the fuel tank, resulting in the expulsion of fuel vapor from the fuel tank 4 through the orifice 46 to relieve the positive pressure. Fuel vapor from the orifice 46 can then travel through the passageway 36 and into the containment chamber 14. As the fuel vapor is effectively trapped by the various aforementioned boundaries (e.g., the chamber barrier 38 and the passageway barrier 54) in the containment chamber 14 with the exception of the barrier opening 40, fuel vapors exit through the barrier opening and into the evaporative chamber 12. Fuel vapors entering the evaporative chamber 12 are filtered (to obtain fuel vapors that are without (or substantially without) the hydrocarbon component) by the filter media situated within the evaporative chamber before being vented out to the atmosphere through the atmospheric vent 28. Thus, the vent path defined by the orifice 46 leading to the passageway 36 within the containment chamber 14 and the evaporative filter within the evaporative chamber 12, and out to the atmosphere through the atmospheric vent 28 is provided by the evaporative fuel tank vent system 6 for venting fuel vapors from the fuel tank 4.

When the fuel level within the fuel tank 4 lowers in temperature, or is consumed by the engine 2, a negative pressure is created in the fuel tank. The vacuum created from the negative pressure pulls atmospheric air into the fuel tank 4 to prevent the fuel tank from collapsing. Atmospheric air enters the fuel tank 4 through the same path (e.g., the vent path described above) that fuel vapor is exhausted by, except in the opposite direction. In other words, during conditions of negative pressure, atmospheric air is pulled into the evaporative chamber 12 through the atmospheric vent 28 thereof and after passing through the evaporative filter situated therein, the air is passed into the containment chamber 14. As the atmospheric air is passed through the evaporative filter within the evaporative chamber 12, it purges (e.g., recovers) any fuel component trapped within the filter (e.g., during the venting of the fuel vapors into the atmosphere), and carries that fuel component along through the barrier opening 40 and the outlet opening 44 into the containment chamber 14. Within the containment chamber 14, the air plus the fuel component is directed through the first and second passageway portions 48 and 50, respectively, via the redirecting portion 52 of the passageway 36 towards the inlet opening 42. At the inlet opening 42, the air plus the fuel component is directed through the orifice 46 into the fuel tank 4, thereby reducing fuel wastage When the fuel tank 4 is in a substantially horizontal position, such as when a vehicle is either operated or parked on a substantially flat surface, fuel vapors can be readily vented and atmospheric air can be drawn into the fuel tank 4, and the possibility of liquid fuel entering the evaporation chamber 12 is of little consequence. Under these conditions, the compact and integrated evaporative fuel tank vent system 6 provides a minimally evasive solution to venting through the vent path and evaporative filtering. However, the fuel tank 4 need not always be positioned in a horizontal position, but rather at various angles of operation such that minute quantities of liquid fuel may enter the containment and the evaporative chambers 14 and 12, respectively. Such situations and the usage of the evaporative fuel tank vent system 6 to drain the liquid fuel back into the fuel tank 4, is described below with respect to FIGS. 6A and 6B.

Figure 6B:
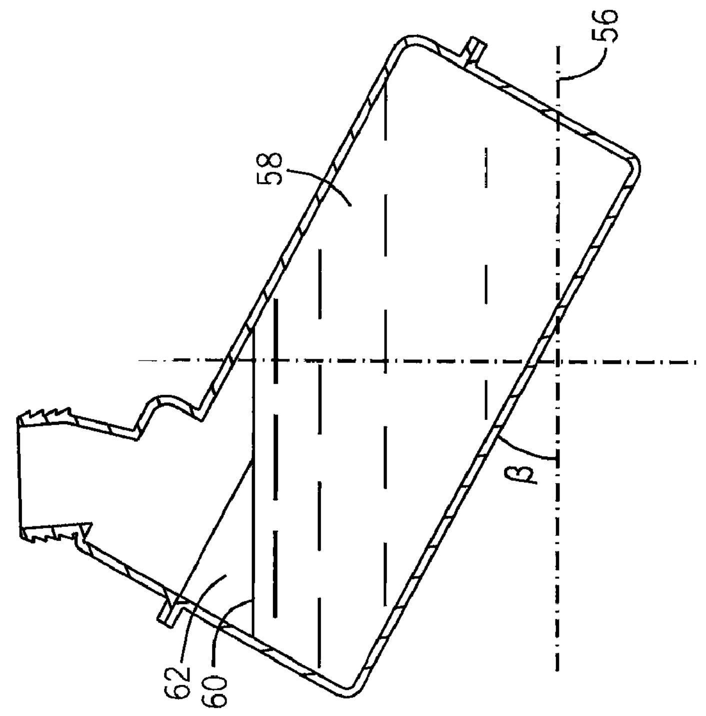
FIG. 6B is a side view of another exemplary fuel tank having the evaporative fuel tank vent system of FIG. 3 mounted thereto, the fuel tank situated at a second angle of operation.
Figure 6A:
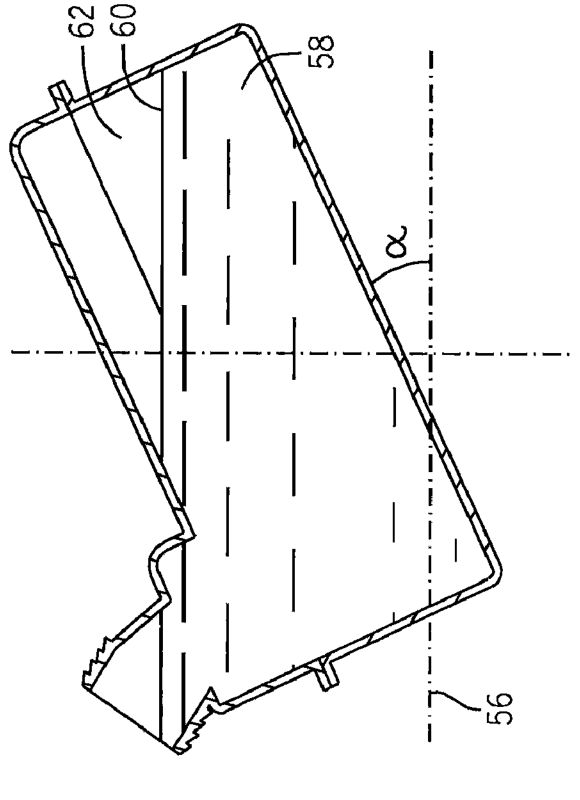
FIG. 6A is a side view of an exemplary fuel tank having the evaporative fuel tank vent system of FIG. 3 mounted thereto, the fuel tank situated at a first angle of operation.

Turning now to FIGS. 6A and 6B, operation of the evaporative fuel tank system 6 when mounted to the fuel tank 4 positioned at various angles of operation is illustrated, in accordance with at least some embodiments of the present invention. FIG. 6A in particular shows the fuel tank 4 to be situated at a side angle α (left tilt) with respect to a horizontal plane 56, while FIG. 6B shows the depicts the fuel tank to be situated at an angle β (right tilt), with respect to the horizontal plane. Each of the side angles α and β can include angles of about 0-90 degrees. Further, each of the angled (e.g., tilted) positions of the fuel tank 4 are representative of a fuel tank that is mounted in a vehicle that is being operated or otherwise situated at a side angled position. It will be understood that "all angles of operation" is intended to encompass all intended angles and/or positions of the engine on which the fuel tank (e.g., the fuel tank 4) is mounted during (or for) operation.

As shown in each of FIGS. 6A and 6B, the fuel tank 4 has mounted thereon the base portion 8 forming the top portion of the fuel tank. The fuel tank 4 is filled with an exemplary liquid fuel 58 having a liquid fuel level 60. A vapor space 62 exists within the fuel tank 4 above the liquid fuel level 60. It should be noted that for purposes of illustrating the liquid fuel within the fuel tank 4, the fuel tank has been shown as being translucent, although this need not be the case in other embodiments. Rather, in other embodiments, the fuel tank 4 can be opaque or possibly even transparent in nature.

As seen in FIG. 6A, when the fuel tank 4 is in a left tilt position, the fuel level 60 is typically situated below the orifice 46 (see FIG. 5) and therefore the liquid fuel 58 is substantially prevented from entering the passageway 36, while the fuel tank remains vented to the atmosphere. Similarly, as shown in FIG. 6B, when the fuel tank 4 is in a right tilt position, the fuel level 60 is typically situated below the orifice 46 (see FIG. 5) and therefore the liquid fuel 58 is substantially prevented from entering the passageway 36, while the fuel tank remains vented to the atmosphere. In a situation where the fuel tank 4 is overfilled resulting in a higher than expected fuel level 60, the fuel level can be situated above the orifice 46 and the liquid fuel 58 can enter the second passageway portion 50 of the passageway 36. Relatedly, when the fuel tank 4 has sufficient amount of the liquid fuel 58 therein and the fuel tank is substantially tilted, the fuel level 60 can also reach the orifice 46.

Although under the aforementioned conditions where the liquid fuel 58 can enter the passageway 36, it is substantially prevented from advancing further into the containment chamber 14 by the ascending angle of the second passageway portion 50 of the passageway 36. The ascending second passageway portion 50 biases the fuel away from the redirecting portion 52 and towards the orifice 46. Fuel that is incidentally located in the second passageway portion 50 can be pulled back into the fuel tank 4 by the vacuum created by the negative pressure in the fuel tank as it attempts to pull atmospheric air inwards to compensate for the fuel being consumed.

Further, as the fuel tank 4 is moved in various different directions and various angles of operation, the liquid fuel 58 can be inadvertently expelled into the passageway 36. For example, if fuel tank 4 is rapidly moved between sideways, downward and upward angles, the liquid fuel 58 that enters the second passageway portion 50 can flow past the redirecting portion 52 and enter the first passageway portion 48 before it has the opportunity to flow back into the fuel tank 4 via the orifice 46. The redirecting portion 52 provides one flow restriction and the ascending first passageway portion 48 provides another flow restriction to limit the flow of fuel past the containment chamber 14. Fuel that has flowed past the passageway 36 and towards the outlet opening 44 is at least partially blocked from leaving the containment chamber 14 by the chamber barrier 38. Thus, the liquid fuel 58 has to defy gravity, traverse a bi-directional ascending passageway 36 (e.g., the second passageway portion 50 ascending from the inlet opening 42 to the redirecting portion 52 and the first passageway portion ascending from the redirecting portion to the outlet opening 44) to reach the outlet opening 44 and cross the chamber barrier 38 to reach the evaporative chamber 12.

Any fuel that flows past the chamber barrier 38 through the barrier opening 40 can enter the evaporative chamber 12, although the fuel would have to pass through the filter and atmospheric vent 28 to exit the evaporative fuel tank vent system 6. Thus, any liquid fuel 58 reaching the evaporative chamber 12 is contained therewithin, thereby preventing any spillage of the liquid fuel to the outside Further, even when the liquid fuel 58 has entered the passageway 36 within the containment chamber 14 and/or the evaporative chamber 12, and when the fuel tank 4 is even temporarily moved to a substantially horizontal position, any fuel within the containment and the evaporative chambers can be drained back into the fuel tank 4 by gravity. Specifically, the fuel within the containment and/or the evaporative chambers 14 and 12, respectively, will be biased by gravity to return to the fuel tank 4 via the passageway 36 and the orifice 46; this bias can be assisted by the vacuum at the orifice during the consumption of fuel in the fuel tank 4.

Thus, the use of gravity and/or vacuum to return the liquid fuel 58 to the fuel tank 4 can be utilized not only when the fuel tank 4 is in a horizontal position, but in various positions primarily due to at least the bi-directional passageway 36 descending from the outlet opening 44 to the inlet opening 42. Further, the aforementioned arrangement for the evaporative fuel tank vent system 6 substantially eliminates the exit of fuel from the engine 2 when operated at various angles, without the need for a roll-over valve, while allowing fuel to flow to the engine from the fuel tank 4 and atmospheric air to be pulled into the fuel tank 4 as needed. Thus, when the fuel tank 4 is otherwise sealed (non-vented fuel tank cap properly installed), the only path for venting fuel vapor from the fuel tank 4 is through the orifice 46 and eventually through the atmospheric vent 28 in the evaporative chamber 12. Similarly, the only path for atmospheric air into the fuel tank 4 is through the atmospheric vent 28 and eventually through the orifice 46. In other embodiments, various other ports with or without control valves can be included as well.

Figure 7:
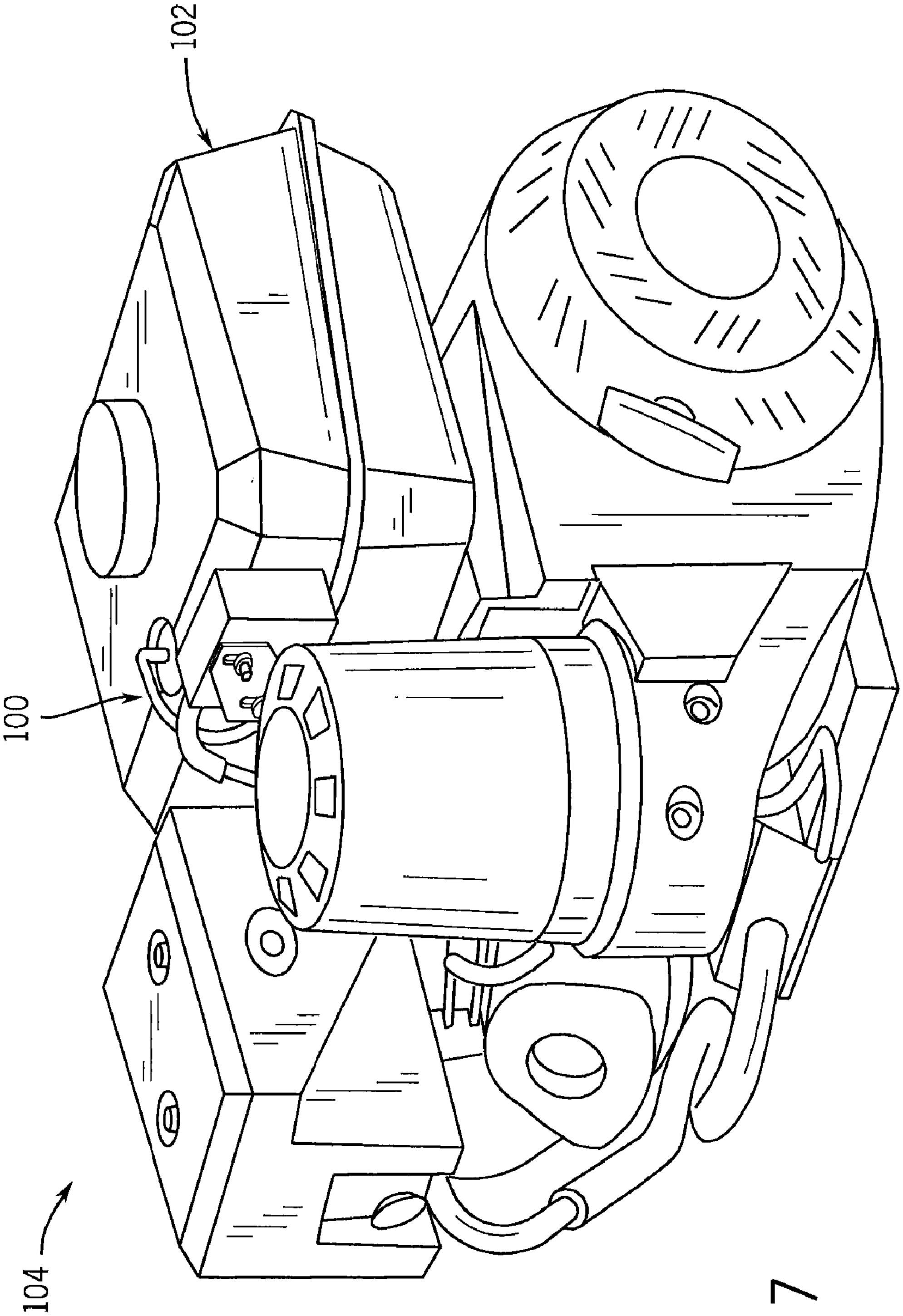
FIG. 7 is a perspective view of a horizontal crankshaft internal combustion engine having a fuel tank and a second embodiment of an evaporative fuel tank vent system operatively mounted to the fuel tank, in accordance with at least some embodiments of the present invention.
Figure 8:
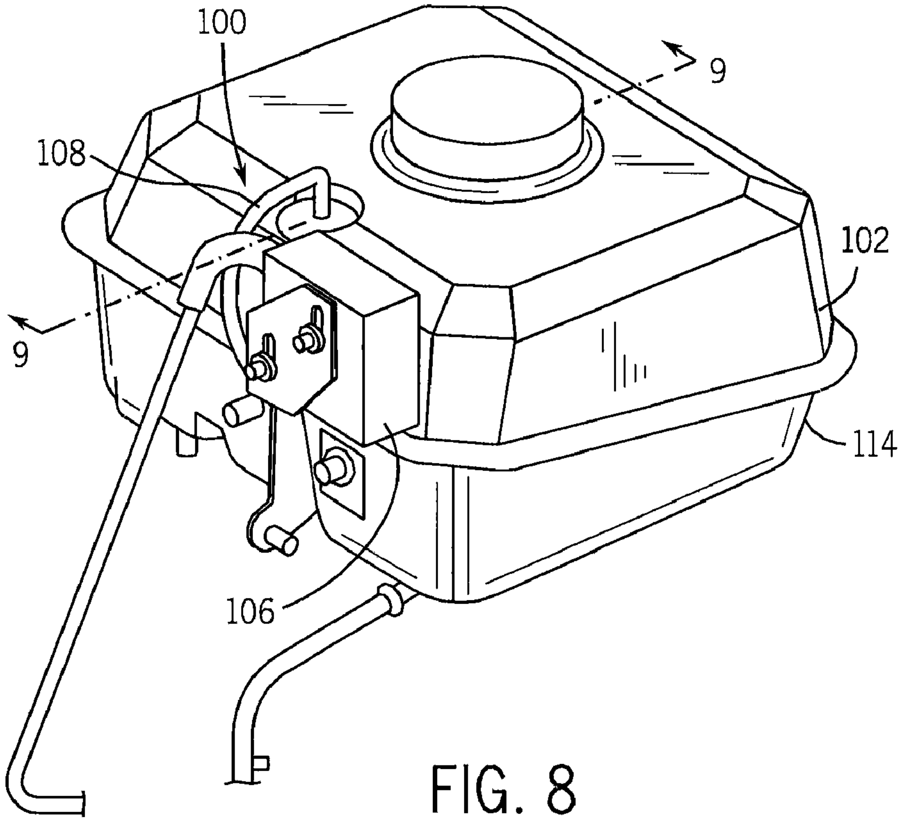
FIG. 8 is a perspective view of the evaporative fuel tank vent system of FIG. 7.
Figure 10:
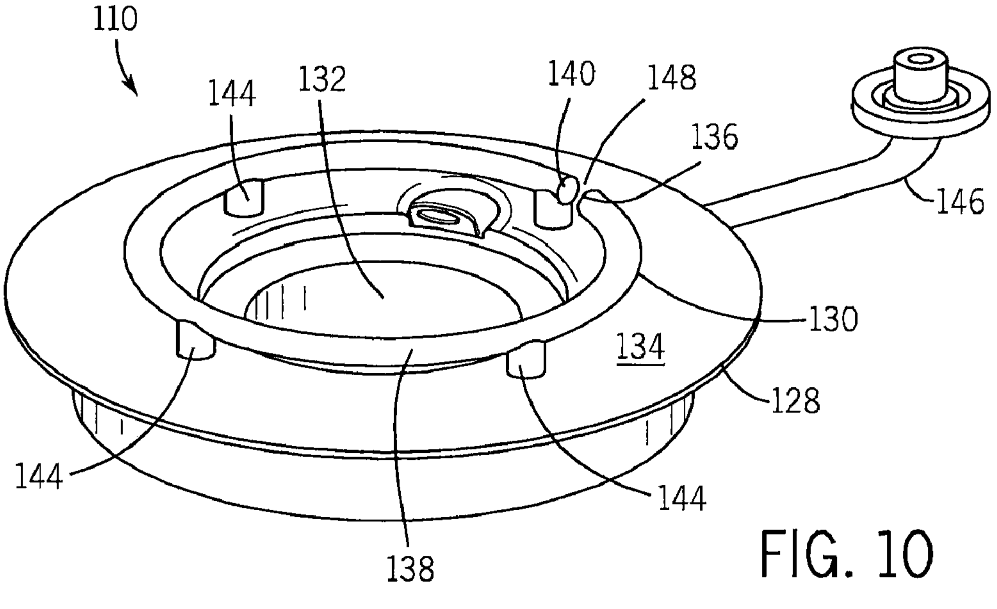
FIG. 10 is a perspective view of a flow assembly of the evaporative fuel tank vent system of FIG. 7, in accordance with at least some embodiments of the present invention.
Figure 9:
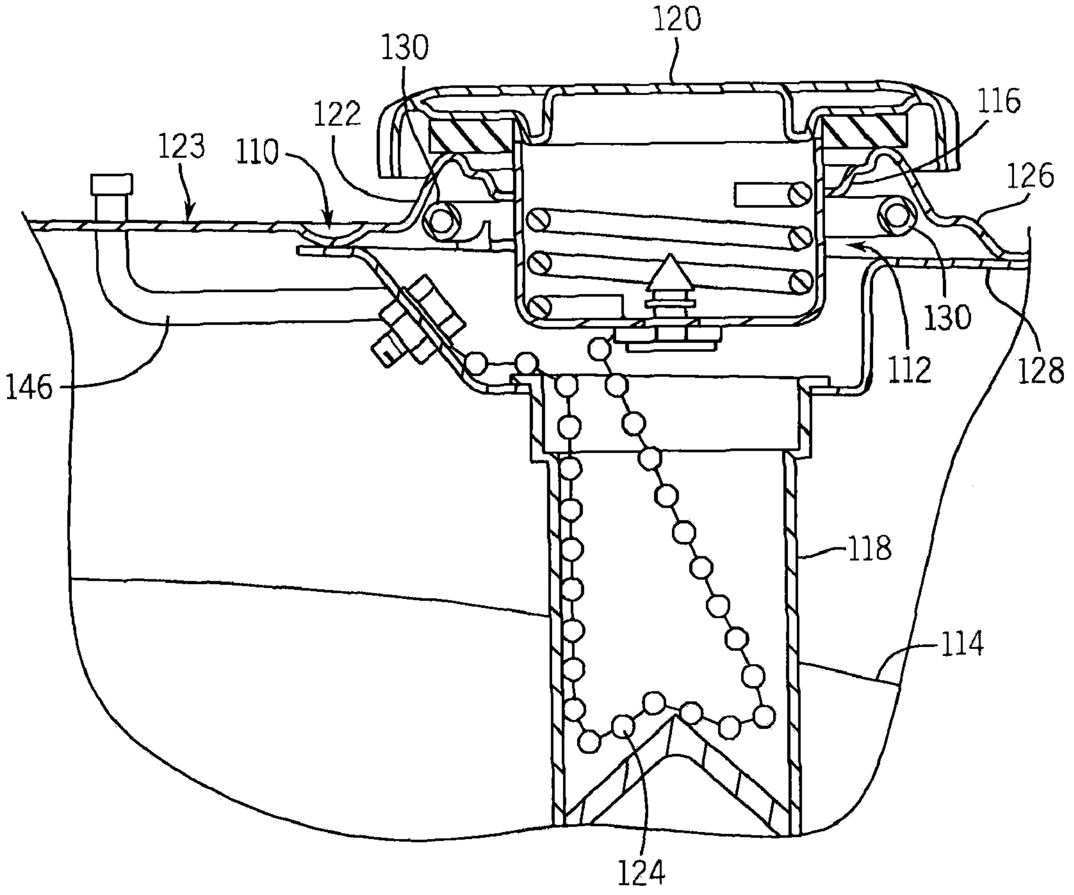
FIG. 9 is an enlarged cross-sectional view of a portion of the evaporative fuel tank vent system taken along lines A-A of FIG. 8.

Referring now to FIGS. 7-10, a second embodiment of an evaporative fuel tank vent system 100 mounted to a fuel tank 102 is shown, in accordance with at least some embodiments of the present invention. FIG. 7 in particular illustrates the evaporative fuel tank vent system 100 mounted onto the fuel tank 102, which in turn is mounted onto a horizontal crankshaft internal combustion engine 104, while FIGS. 8-10 show various aspects of the evaporative fuel tank vent system in greater detail. Notwithstanding the fact that the engine 104 is a horizontal crankshaft engine, it will be understood that the evaporative fuel tank vent system 100 is equally capable of being employed in a vertical crankshaft engine, such as the internal combustion engine 2 shown in FIG. 1.

Turning now to FIGS. 8 and 9, FIG. 8 shows the evaporative fuel tank vent system 100 mounted onto the fuel tank 102, while FIG. 9 is a cross-sectional view taken along lines A-A of FIG. 8. Referring to both FIGS. 8 and 9, the evaporative fuel tank vent system 100 includes an evaporative chamber 106 that is in communication with the fuel tank 102 via a passage 108 through a flow assembly 110 positioned within a containment chamber 112.

With respect to the fuel tank 102 in particular, it includes a fuel tank body 114 connected at least indirectly to a fuel tank opening 116 via a channel 118. The fuel tank 102 additionally includes a fuel tank cap 120 threadingly engaged within a tubular fuel tank neck 122 extending vertically (or substantially vertically) between the fuel tank opening 116 and a top portion 123 of the fuel tank. In at least some embodiments, a chain 124 connected to the fuel tank 102 (or to another structure) and the fuel tank cap 120 prevents disengagement of the fuel tank cap with the fuel tank, thereby preventing the fuel tank cap from getting lost during re-fueling Furthermore, in at least some embodiments, a portion of the fuel tank neck 122 can be formed as a circular pocket 126, such that as the fuel tank neck extends upwardly from the fuel tank top surface 123, it bends inwardly and downwardly towards the fuel tank 102 to define a fill aperture (such as the fuel tank opening 116) for filling the fuel tank with fuel. In other embodiments, the pocket 126 can be formed in another manner such that it is situated adjacent to the fuel tank top surface 123, and can assume various geometrical (or possibly non-geometrical as well) shapes such as, circular, square, pentagonal, etc.

As indicated above, the evaporative fuel tank vent system 100 includes the flow assembly 110, which in at least some embodiments can be mounted adjacent to or flush with the fuel tank top surface 123. The flow assembly 110 in particular includes a base plate 128, such that the containment chamber 112 is defined by the fuel tank cap 120, the fuel tank neck 122 and the base plate. The flow assembly is described in greater detail in FIG. 10. The base plate 128 in at least some embodiments is a circular plate or plate-like structure, although in other embodiments, the base plate can take other forms.

Referring now to FIG. 10 in conjunction with FIG. 9, the flow assembly 110 includes a tube 130 defining a passageway therein. The tube 130 is at least partially situated within the containment chamber 112. As indicated above, the base plate 128 is secured adjacent to the fuel tank top surface 123 and in one embodiment, takes the form of a circular plate that includes a central tubular guard aperture 132 that extends downward away from the fuel tank top surface. In other embodiments, the base plate 128 can be of varied shapes and include various styles of guard apertures to allow fuel to flow therethrough while limiting the flow of splashed fuel towards the fuel tank neck 122, for example, a row of planar baffles secured together can be used.

Additionally, the tube 130 is secured adjacent to a base plate top portion 134, such that when the base plate 128 is secured to the fuel tank top surface 123, the tube 130 is substantially situated in the pocket 126 of the fuel tank neck 122. The tube 130 can include an inlet 136, an inlet portion 138, and a redirecting portion 140 such that the inlet 136 is an aperture that communicates a vent path (also referred to as a flow path) through the inlet portion 138 and redirecting portion 140. In one embodiment, the inlet portion 138 can be in the shape of a circular tube (e.g., portion of the tube 130) that is situated above a base plate top portion 134 using one or more supports 144 that provide adequate elevation to situate the tube 130 substantially inside the pocket 126. In another embodiment, the inlet portion 138 can be one of various shapes, such as a pentagon with a hollow rectangular cross-section.

The inlet portion 138 extends substantially around the pocket 126 and into the redirecting portion 140 having a substantially similar diameter. The redirecting portion 140 alters the direction of flow through the inlet portion 138. In one embodiment, the redirecting portion 140 extends to an outlet portion 146 that passes through the base plate top portion 134. The inlet 136 can be situated adjacent the juncture point of the inlet portion 138 and the redirecting portion 140, thus forming a gap 148 therebetween. Minimizing the gap 148 limits the amount of fuel that can splash into the inlet 136 and potentially end up exiting the inlet portion 138. Additionally, in order to utilize the force of gravity to minimize the flow of fuel out of the fuel tank 102 through the tube 130, the inlet portion 138 can be supported to ascend as it extends from the inlet 136 to the redirecting portion 140. This configuration requires the fuel in the fuel tank 102 to flow up at least a portion of an ascending path against the force of gravity, whether the fuel tank is tilted left, right, forwards or backwards. In other embodiments, the inlet 136 can be situated at approximately the same height as the redirecting portion 140.

In one embodiment, the outlet portion 146 extends from the redirecting portion 140 to an outlet 150, wherein the outlet 150 is situated adjacent to the exterior of the fuel tank 102 (best seen in FIG. 8). Although the redirecting portion 140 and the outlet portion 146 can vary in shape and size, in at least one embodiment they are tubular. The routing of the outlet portion 146 from the redirecting portion 140 to the outlet 150 can be a U-shaped configuration as best shown in FIG. 9, wherein the redirecting portion 140 extends downward to the outlet portion 146 and then the outlet portion 146 extends upwards to the outlet 150. This configuration thus utilizes the force of gravity to limit the flow of fuel that can pass out of the fuel tank 102, e.g., due to locating the redirecting portion 140 at a high point in the fuel tank 102 and also locating the outlet 150 at another high point in the fuel tank. In other embodiments, other routing configurations can be used to impart the force of gravity against the flow of fuel. Thus, by virtue of positioning the inlet 136 at the same or preferably higher point than each of the redirecting portion 140, the outlet portion 146 and the outlet 150, liquid fuel can be facilitated to drain back into the fuel tank by virtue of gravity.

Turning back now to FIG. 8, in at least some embodiments, the outlet portion 146 and, particularly, the outlet 150 of the outlet portion, is in communication with the evaporative chamber 106 via the passage 108, such as a rigid or flexible tube. The evaporative chamber 106 includes a material (e.g., an evaporative filter) for filtering fuel vapors and can be mounted on or adjacent to the fuel tank top surface 123, or otherwise about the engine 104 or the vehicle employing the engine 104. Further, in some embodiments, the outlet portion 146 can be in direct communication with an air intake point of the engine 104.

Thus, the present invention advantageously functions using gravity and geometry. Given that the embodiments described above do not have any moving parts, the evaporative fuel tank vent system of the present invention is significantly less likely to malfunction. Furthermore, the evaporative fuel tank vent system is located either on the fuel tank or integral thereto in a way that avoids damage or removal of the vent system and makes the system easy to package and assemble. In addition, the evaporative fuel tank vent system of the present invention utilizes inexpensive components made of either plastic or metal to redirect the vent vapors from the fuel tank in which multiple directions of the vent path prevent the fuel from exiting the fuel tank. Also, the evaporative fuel tank vent system is designed such that it will always have a position that requires the fuel to defy gravity to complete the vent path out of the tank for all required angles of operation. Furthermore, by virtue of being integral with the fuel tank or at least sharing a wall with the fuel tank, any external vent lines can be eliminated, thereby providing a vent system in which any liquid fuel that enters the evaporative chamber can be allowed to drain back into the fuel tank.

Notwithstanding the embodiments of the evaporative fuel tank vent system described above with respect to FIGS. 1-10, it is an intention of this invention to encompass a variety of arrangements including a variety of refinements and/or additional features to the embodiments described above. Additionally, the exact shapes, sizes, and materials of the various components described above can vary depending upon the embodiment and the application employing the evaporative fuel tank vent system. For example, although the various components of FIGS. 1-10 have been described as being constructed of specific materials, it should be understood that in other embodiments, other types of materials can be employed as well.

Also, it is contemplated that embodiments of the present invention are applicable to engines that have less than one liter in displacement, or engines that both have less than one liter in displacement and fit within the guidelines specified by the above-mentioned regulations. In still further embodiments, the present invention is intended to encompass other small engines, large spark ignition (LSI) engines, and/or other larger (mid-size or even large) engines.

It is specifically intended that the present invention not be limited to the embodiments and illustrations contained herein, but include modified forms of those embodiments, including portions of the embodiments and combinations of elements of different embodiments as come within the scope of the following claims.

We claim:

1. An evaporative venting system for use in an internal combustion engine, the system comprising:

a containment chamber in at least indirect communication with a fuel tank; and a passageway disposed substantially within the containment chamber and having an inlet opening and an outlet opening; and a redirecting portion that at least partially changes the directional path of at least one of a fuel, fuel vapors and air;

wherein the inlet opening is in at least indirect communication with the fuel tank and the outlet opening is in at least indirect communication with an evaporative chamber such that the passageway provides a vent path between the fuel tank and the evaporative chamber;

wherein the passageway further includes a first passageway portion that extends at a descending angle from the outlet opening to the redirecting portion;

wherein the passageway further includes a second passageway portion that extends at a descending angle from the redirecting portion to the inlet opening; and wherein the vent path permits both the venting of fuel vapors from the fuel tank and the intake of air into the fuel tank during all angles of operation of the engine.

2. The evaporative venting system of claim 1, wherein the evaporative chamber comprises an atmospheric vent to at least one of receive intake air from the outside and emit fuel vapors to the outside.

3. The evaporative venting system of claim 2, wherein the evaporative chamber further comprises an evaporative filter for at least one of filtering and purging the fuel vapors.

4. The evaporative venting system of claim 1, wherein the passageway is at least partially formed integrally with the fuel tank and is substantially enclosed by the containment chamber.

5. The evaporative venting system of claim 4, wherein the redirecting portion is substantially semi-circular in shape.

6. The evaporative venting system of claim 1, further comprising a base portion including a base plate, and the passageway further comprises a circular tube having an inlet portion, the redirecting portion, and an outlet portion, the inlet portion being situated above the base plate and the redirecting portion being substantially situated above the base plate and extending through the base plate to the outlet portion.

7. The evaporative venting system of claim 1, further comprising a base portion at least one of secured to and partially formed integral with the fuel tank, the base portion at least partially defining the containment and the evaporative chambers.

8. The evaporative venting system of claim 6, wherein the inlet portion extends from the inlet opening to the redirection portion and the redirection portion at least partially alters the angle of the passageway in an upward direction towards the outlet portion.

9. The evaporative venting system of claim 8, wherein the outlet portion extends through a fuel tank top surface and is connected to the evaporative chamber via a passage.

10. The evaporative venting system of claim 1, wherein the containment and the evaporative chambers are separated at least partially by a chamber barrier to at least partially limit the flow of fuel from the containment chamber into the evaporative chamber, the chamber barrier having a barrier opening to allow the flow of air or fuel vapors between the containment chamber and evaporative chamber.

11. The evaporative venting system of claim 1, wherein the first and the second passageway portions are connected together by the redirecting portion to form a substantially U-shaped configuration to change the direction of the flow of air, fuel vapors or fuel through the passageway.

12. The evaporative venting system of claim 11, wherein a passageway barrier is situated substantially between the first and the second passageway portions to prevent fuel from moving directly between the first and the second passageway portions absent the redirecting portion.

13. The evaporative venting system of claim 1, further comprising an inlet opening comprising an orifice which provides direct contact with the fuel tank.

14. The evaporative venting system of claim 13, wherein the inlet opening is formed as a pit for facilitating fuel collection.

15. The evaporative venting system of claim 1, wherein the passageway is at least partially integrally formed within a base top portion of a base portion defining a channel that is at least partially depressed into the fuel tank.

16. The evaporative venting system of claim 1, wherein an edge barrier substantially encloses the perimeter of a base top portion of a base portion to at least partially define the containment and the evaporative chambers.

17. The evaporative venting system of claim 1, wherein the passageway is formed of raised walls on a base top portion of a base portion within the containment chamber and situated above the fuel tank.

18. A method of venting fuel vapors from a fuel tank, the method comprising:

providing (i) a base portion in operable association with a fuel tank; (ii) a containment chamber defined at least in part by the base portion; and (iii) a passageway disposed substantially within the containment chamber and having an inlet opening and an outlet opening, wherein the inlet opening is at least indirectly in communication with the fuel tank and the outlet opening is at least indirectly in communication with an evaporative chamber; and venting fuel vapors from the fuel tank into the atmosphere through the evaporative chamber via the passageway, when the fuel tank is positively pressured, wherein venting fuel vapors from the fuel tank further comprises:

guiding the fuel vapors along an ascending second passageway portion within the passageway;

redirecting the fuel vapors in at least a partially opposing direction from the second passageway portion through an ascending first passageway portion of the passageway; and guiding the fuel vapors from the first passageway portion into an evaporative chamber via the outlet opening.

19. The method of claim 18, wherein the passageway defines a vent path for both the venting of fuel vapors and the intake of air during all angles of operation.

20. The method of claim 18, wherein the venting of fuel vapors further comprises:

filtering the fuel vapors through the evaporative chamber using a filter media; and exiting the fuel vapors from the evaporative chamber through an atmospheric vent.

21. The evaporative venting system of claim 1 in combination with an engine.

22. The evaporative venting system of claim 1, wherein at least a portion of the passageway has a substantially circular path.

* * * * *